US010829415B2

(12) United States Patent
Magarotto et al.

(10) Patent No.: US 10,829,415 B2
(45) Date of Patent: Nov. 10, 2020

(54) SURFACE-MODIFIED POLYOLEFIN FIBERS

(71) Applicant: Construction Research & Technology, GmbH, Trostberg (DE)

(72) Inventors: Roberta Magarotto, Ponzano Veneto (IT); Francesca Moratti, Povegliano (IT); Sandro Moro, Silea (IT); Marino Colasuonno, Italien (IT); Alessandro Patelli, Venice (IT); Bryan Erick Barragan, Sant Jordi-Palma de Mallorca (ES)

(73) Assignee: Construction Research & Technology, GmbH, Trostberg (DE)

( * ) Notice: Subject to any disclaimer, the term of this patent is extended or adjusted under 35 U.S.C. 154(b) by 295 days.

(21) Appl. No.: 15/527,883

(22) PCT Filed: Aug. 10, 2015

(86) PCT No.: PCT/EP2015/068357
§ 371 (c)(1),
(2) Date: May 18, 2017

(87) PCT Pub. No.: WO2016/082949
PCT Pub. Date: Jun. 2, 2016

(65) Prior Publication Data
US 2018/0327309 A1 Nov. 15, 2018

(30) Foreign Application Priority Data

Nov. 27, 2014 (EP) ..................................... 14195064

(51) Int. Cl.
| | | |
|---|---|---|
| *C04B 16/06* | (2006.01) | |
| *C04B 28/04* | (2006.01) | |
| *D06M 10/02* | (2006.01) | |
| *D06M 10/08* | (2006.01) | |
| *D06M 13/52* | (2006.01) | |
| *D06M 11/79* | (2006.01) | |
| *D06M 13/51* | (2006.01) | |
| *C04B 20/00* | (2006.01) | |
| *C04B 20/02* | (2006.01) | |
| *D06M 13/513* | (2006.01) | |
| *E04C 5/07* | (2006.01) | |
| *D06M 101/20* | (2006.01) | |
| *C04B 103/00* | (2006.01) | |

(52) U.S. Cl.
CPC ...... *C04B 16/0633* (2013.01); *C04B 16/0625* (2013.01); *C04B 20/0068* (2013.01); *C04B 20/023* (2013.01); *C04B 28/04* (2013.01); *D06M 10/025* (2013.01); *D06M 10/08* (2013.01); *D06M 11/79* (2013.01); *D06M 13/51* (2013.01); *D06M 13/513* (2013.01); *D06M 13/52* (2013.01); *C04B 2103/004* (2013.01); *D06M 2101/20* (2013.01); *D06M 2400/01* (2013.01); *E04C 5/073* (2013.01); *Y02W 30/91* (2015.05)

(58) Field of Classification Search
CPC .............. C04B 16/0633; C04B 20/023; C04B 20/0068; C04B 28/04; D06M 13/52; D06M 13/513; D06M 10/025; D06M 10/08; D06M 2400/01; D06M 2101/20; E04C 5/073
See application file for complete search history.

(56) References Cited

U.S. PATENT DOCUMENTS

| | | | |
|---|---|---|---|
| 3,956,450 A | 5/1976 | Abe et al. | |
| 4,310,478 A | 1/1982 | Balslev et al. | |
| 5,705,233 A | 1/1998 | Denes et al. | |
| 5,788,760 A * | 8/1998 | Li | ........................... C04B 16/10 106/644 |
| 7,455,892 B2 | 11/2008 | Goodwin et al. | |
| 8,496,861 B2 | 7/2013 | Kaufmann et al. | |
| 2004/0022945 A1 | 2/2004 | Goodwin et al. | |
| 2006/0078729 A1 | 4/2006 | Yabuki et al. | |
| 2009/0069790 A1 | 3/2009 | Yokley et al. | |
| 2009/0136755 A1 | 5/2009 | Kaufmann et al. | |
| 2009/0305038 A1 * | 12/2009 | Duran | .................... C04B 16/06 428/395 |
| 2012/0146254 A1 | 6/2012 | Kaufmann et al. | |

FOREIGN PATENT DOCUMENTS

| | | |
|---|---|---|
| DE | 29 27 238 | 1/1980 |
| EP | 0 225 036 A1 | 6/1987 |
| EP | 1 580 173 A1 | 9/2005 |
| JP | H05-132345 A | 5/1993 |
| WO | WO 97/32825 | 9/1997 |
| WO | WO 02/28548 A2 | 4/2002 |
| WO | WO 2007/036058 A1 | 4/2007 |

OTHER PUBLICATIONS

Ren, Y., et al.; Surface Coatings & Technology, 2007, p. 2670-2676.*
Zhang, C., et al,; Journal of Applied Polymer Science, 2000, vol. 76, p. 1985-1996.*
PCT/EP2015/068357—International Search Report, dated Nov. 10, 2015.
PCT/EP2015/068357—International Written Opinion, dated Nov. 10, 2015.
PCT/EP2015/068357—International Preliminary Report on Patentability, dated May 30, 2017.
Mahlberg, R., et al., "Effect of Oxygen and Hexamethyldisiloxane Plasma on Morphology, Wettability and Adhesion Properties of Polypropylene and Lignocellulosics", International Journal of Adhesion and Adhesives, Aug. 1998, pp. 283-297, vol. 18, Issue 4.

(Continued)

*Primary Examiner* — Robert S Jones, Jr.
(74) *Attorney, Agent, or Firm* — Curatolo Sidoti Co., LPA; Salvatote A Sidoti; Floyd Trillis, III

(57) ABSTRACT

The present invention relates to surface-modified polyolefin fibers, the use of these fibers in hydraulic binder compositions, hydraulic binder compositions containing these fibers and a method for reinforcing hydraulic binder compositions.

23 Claims, 8 Drawing Sheets

(56) References Cited

OTHER PUBLICATIONS

Sarmadi, A.M., et al., "HMDSO-Plasma Modification of Polypropylene Fabrics", European Polymer Journal, Sep. 1995, pp. 847-857, vol. 31, Issue 9.
Li, et al. "Interface Property Characterization and Strengthening Mechanisms in Fiber Reinforced Cement Based Composites," Advanced Cement Based Materials, 1997. vol. 6, pp. 1-20.
Naaman, et al., "Developments in Fiber-Reinforcement for Concrete," Technical Report, R72-28, Cambridge, M.I.T. Dept. of Civil Engineering, Materials Research Laboratory, 1972, p. 67.
Naaman, et al., "Developments in Fiber-Reinforcement for Concrete," Technical Report, R72-28, M.I.T. Dept. of Civil Engineering, Materials Research Laboratory, May 1972, p. 67, Cambridge, MA (USA).

* cited by examiner

Fig. 7B
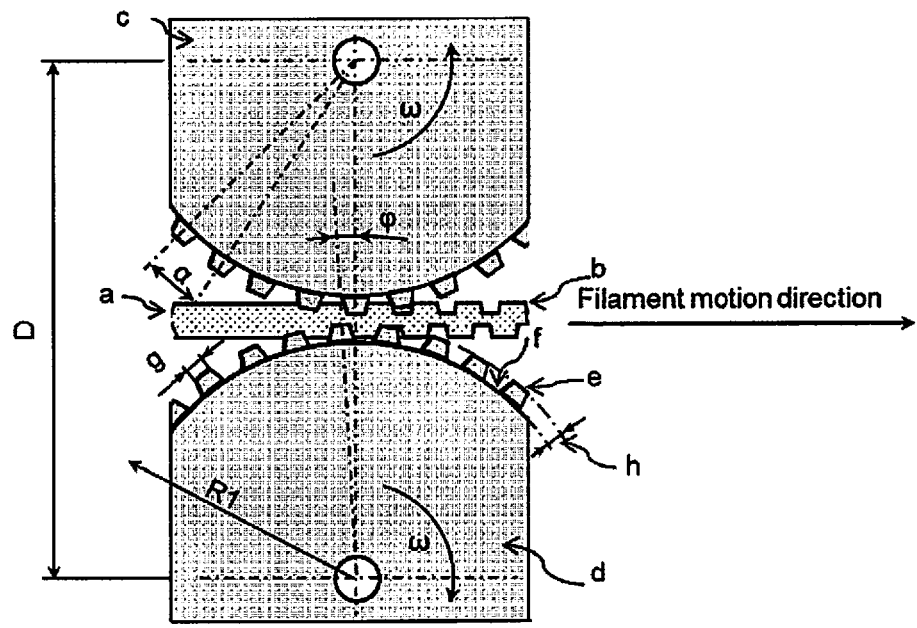
Fig. 7C
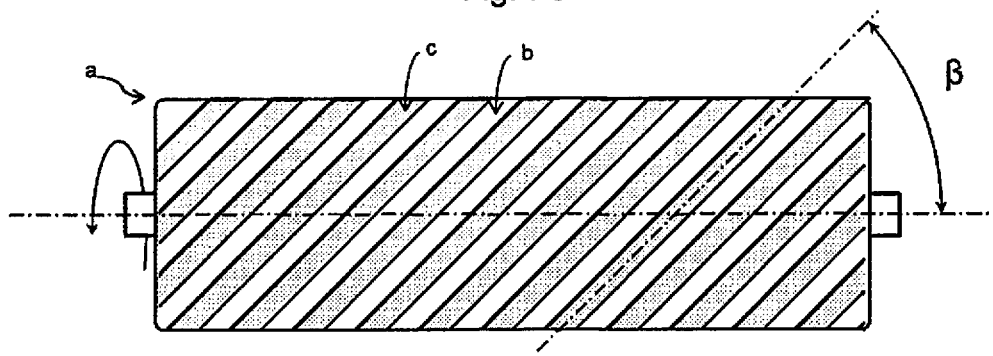
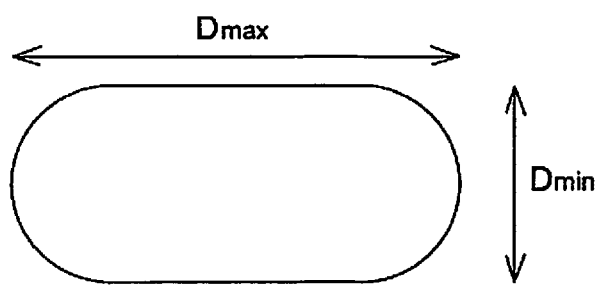
Fig. 8

SURFACE-MODIFIED POLYOLEFIN FIBERS

CROSS REFERENCE TO RELATED APPLICATIONS

This application is a national stage application of International Application No. PCT/EP2015/068357, filed 10 Aug. 2015, which claims priority from European Patent Application No. 14195064.2, filed 27 Nov. 2014, which applications are incorporated herein by reference.

The present invention relates to surface-modified polyolefin fibers, the use of these fibers in hydraulic binder compositions, hydraulic binder compositions containing these fibers and a method for reinforcing hydraulic binder compositions.

Building and construction materials based on hydraulic and non-hydraulic binders are examples, where composite fibers are employed to modulate the physical properties according to specific needs. Concrete and mortar are relatively brittle materials, where the tensile strength is typically much lower compared to the compressive strength of the material. Therefore, under normal circumstances concrete needs to be reinforced, usually with steel reinforcing bars. It has become increasingly popular to additionally reinforce concrete or mortar with short randomly distributed fibers of various types to satisfy the needs of modern building industry. The main purpose is not only to increase the toughness (resistance to cracking), but also to improve the tensile strength (crack strength) and ductility of the building materials.

Mortar is a mixture of fine aggregates with hydraulic cement, whereas concrete additionally contains coarse aggregates. The cement constituent is used as a synthetic inorganic material making up the matrix into which the aggregates are embedded. Concrete and mortar mixtures may also contain pozzolanes and other admixtures, commonly utilized for conventional and special uses, thereby modifying the physical properties of the unhardened and hardened inorganic binder compositions. Cement typically includes anhydrous crystalline calcium silicate ($C_3S$ and $C_2S$), lime and alumina. In the presence of water the silicates react to form hydrates and calcium hydroxide. The hardened structure of cement depends on a three dimensional nature and complex arrangement of newly formed crystals that intrinsically depends on the quantities of the ingredients, curing time and composition of the concrete aggregates. In the course of the hardening process plastic, chemical or dewatering shrinkage may create voids causing defects and shrinkage cracks. Moreover, sulfate attack in concrete and mortar often is the cause of internal pressure producing cracks in the material and in consequence destabilizes structures made of such material.

In the process of counteracting potential defects fibers have been introduced into inorganic binder compositions to reinforce the final matrices. Interfacial bond strength governs many important composite properties, such as overall composite strength, ductility, energy absorption property etc. A variety of fibers, natural and synthetic, have been used in inorganic binder compositions to increase the stability of resulting structural elements made for example from concrete mixtures. Examples for such fibers are natural materials, such as cellulose-based fibers, like cotton, viscose, hemp, jute, sisal, abaca, bamboo, cellulose, regenerated cellulose (e.g. Lyocell®), synthetic materials like polyamide, polyester, polyacrylonitrile, polypropylene, polyethylene, polyvinyl alcohol, aramide, polyolefines, but also inorganic mineral or metal-based materials like carbon, glass, mineral wool, basalt, oxide ceramic and steel.

Fibers of various shapes and sizes produced from such materials are used as stabilizers and reinforcing elements, whereby steel fibers are commonly used for most applications. However, steel introduces the problem of corrosion into cementitious compositions. Examples of commonly used synthetic fibers are polypropylene, polyethylene and polyvinyl alcohol, all suffering from one or more problems, such as high cost (e.g. polyvinyl alcohol), low tenacity or low interfacial bonding (e.g. polypropylene).

A limitation in the use of most fibers as reinforcement agents is a result of the low pull-out strength based on poor wettability and adhesion to the matrix (low interfacial bonding) and to the cementitious material. Failure of fiber-reinforced concrete is primarily due to fiber pull-out or de-bonding. Therefore failure of fiber reinforced concrete will not occur suddenly after initiation of a crack. Since the bonding of fibers to the matrix is mainly mechanical, literature indicates that to obtain good adhesion between fiber and matrix material it is usually necessary to carry out chemical or physical pretreatments. A variety of mechanisms is known and described in the literature and is employed to increase the interfacial bonding of fibers to inorganic binder compositions (Li V. C. et al., Advanced Cement Based Materials, 1997, Vol. 6, 1-20). Increasing the fiber surface area is, for example, one way to increase the area of interaction between fiber and matrix. This increase in surface area enhances the mechanical bond to the matrix and can for example be achieved by fibrillation procedures. Further, surface modulations of fibers have been utilized that lead to improvement of matrix-fiber interaction and mechanical bonding such as twisting, embossing, crimping and introduction of hooks into fibers.

Other means of surface modification also lead to enhancement of adhesion between fiber and matrix. Plasma treatment of, for example, polypropylene fibers with $SiCl_4$ is utilized to introduce polar groups onto the surface, thereby increasing the reactivity and wettability of the fiber (U.S. Pat. No. 5,705,233). This leads to an improved compatibility and bonding to the cementitious matrix and ultimately results in an increased pull-out strength of the respective fibers. However, chloride ions, residual after plasma treatment, are likely to initiate corrosion of steel in steel containing cementitious matrices.

WO 97/32825 discloses processes for enhancing the bond strength of a cement matrix including reinforcement fibers. The reinforcement fibers are produced by a plasma treatment employing an excitable gas. However, the plasma treated fibers suffer from vanishing of the reinforcing effect of the plasma treatment with the time.

Special techniques have been developed to increase the mechanical bond to the matrix and assure advantageous composite properties. The geometry of the fiber influences the bond between the fiber and matrix structure, e.g. fibers of three dimensional shape demonstrate improved bonding properties (Naaman A. E., Mcgarry F. J., Sultan, J. N.—Developments in fiber-reinforcements for concrete, Technical Report, R 72-28, School of Engineering, MIT, May 1972 p. 67).

Synthetic fibers offer a number of advantages as reinforcement agents in concrete. They present high elastic modulus and are cheap. EP 0225036 discloses a method of making polypropylene fibers antistatic and thus increasing the hydrophilicity, whereby the embedding of the fibers in the matrix and uniform distribution is improved. Further disclosed are methods for improving the embedding properties of polypropylene fibers by crimping, roughening or profiled shaping of the fibers.

Sarmadi, A. and Ying, T. ("Hexamethyldisiloxane (HMDSO) Plasma Surface Modification and Grafting of Polypropylene Fabrics", 11th International Symposium on Plasma Chemistry, Loughborough, UK, August 1993) described the use of hexamethyldisiloxane plasma in the treatment of polypropylene fibers. It was found that the plasma treated fibers showed a water uptake less than the untreated fibers. In other words, HMDSO plasma treated fibers exhibit a higher hydrophobicity of polypropylene fibers. In addition, R. Mahlberg et al. (Int. J. Adhes. Adhes. 1998, 18, 283-297) described the treatment of lignocellulosics with hexamethyldisiloxane plasma, resulting in an increased hydrophobicity of the treated material. Increased hydrophobicity of fibers is, however, not desirable for their use in cementitious compositions.

US 2009/0305038 and JP H05 132345 disclose surface-functionalized organic fibers which are useful for reinforcing inorganic binder compositions. The fibers are functionalized by drawing, treating them in a controlled gas environment, such as a plasma, and then contacting them with a solution comprising a sizing agent (US 2009/0305038) or treating them by electron beam irradiation (JP H05 132345).

Despite the measures employed to increase the bonding of fibers to the matrix, the utilization of individual fiber types is still limited because for high-tech and demanding applications the respective pull-out strength is still low and insufficient to satisfy the needs of high performance concrete materials. Further, individual techniques available are restricted to certain fiber materials, for example solely to mineral-based or polymer-based fibers. The hydrophobicity of a variety of fibers for example and respective low wettability and hence low adhesion to a cement matrix is one of the major problems that prevent widespread and large scale use of cheap polymeric material such as polypropylene.

The problem underlying the invention is to provide polyolefin fibers with improved bonding characteristics to construction chemical compositions, such as hydraulic binder compositions. A further problem underlying the invention is to provide polyolefin fibers with improved pull-out strength in hydraulic binder compositions and hydraulic binder compositions containing polyolefin fibers with an improved residual tensile strength, as well as a method for preparing reinforced hydraulic binder compositions.

These problems are solved by surface-modified polyolefin fibers obtainable by a process comprising the steps of a) a pretreatment of the polyolefin fibers by contacting the polyolefin fibers with an electrically excitable gas in a plasma reactor to obtain polyolefin fibers with polar groups on the surface (etching process) and b) plasma treatment of the polyolefin fibers in presence of a gaseous siloxane or silazane compound (deposition process); a hydraulic binder composition containing said surface-modified polyolefin fibers; and a method of preparing them.

BRIEF DESCRIPTION OF THE DRAWINGS

FIG. 7B is an enlarged view of the area indicated in FIG. 7A and illustrating the side view of the embossing rolls.

FIG. 7C is a top view of an embossing roll.

FIG. 8 is a cross-section through a rectangular fiber having round edges.

EMBODIMENTS

Figure 1:
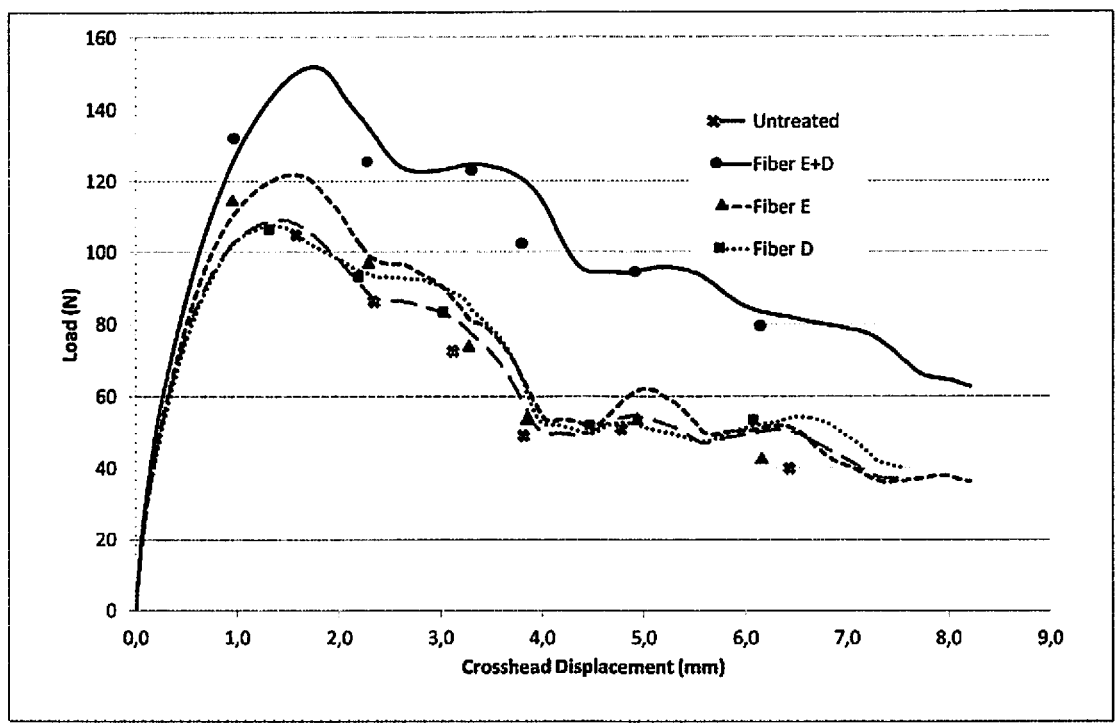
FIG. 1 shows the results of single fiber pull-out tests of untreated polypropylene fibers in comparison to surface-modified polypropylene fibers. (E=etching process, D=deposition process, E+D=etching process+deposition process)

The invention provides surface-modified polyolefin fibers with the following embodiments:
1. Surface-modified polyolefin fibers obtainable (or obtained) by a process comprising the steps of
   a) a pretreatment of the polyolefin fibers by a plasma treatment with an electrically excitable gas in a plasma reactor to obtain polyolefin fibers having polar groups on the surface of the fibers and
   b) plasma treatment of the polyolefin fibers with an electrically excitable gas in presence of a gaseous siloxane or silazane compound in a plasma reactor.
2. The surface-modified polyolefin fibers according to embodiment 1, wherein the polyolefin fibers are selected from polyethylene fibers, polypropylene fibers, or fibers from copolymers thereof, or blends thereof.
3. The surface-modified polyolefin fibers according to embodiment 1 or 2, wherein an electrically excitable gas is admixed to the gaseous siloxane or silazane compound in step b).
4. The surface-modified polyolefin fibers according to embodiment 3, wherein the ratio of gaseous siloxane or silazane compound to electrically excitable gas is from 1/1 to 1/20 (siloxane or silazane compound/electrically excitable gas).
5. The surface-modified polyolefin fibers according to embodiment 3, wherein the ratio of gaseous siloxane or silazane compound to electrically excitable gas is from 1/5 to 1/10 (siloxane or silazane compound/electrically excitable gas).
6. The surface-modified polyolefin fibers according to embodiment 3, wherein the ratio of gaseous siloxane or silazane compound to electrically excitable gas is about 1/10 (siloxane or silazane compound/electrically excitable gas).
7. The surface-modified polyolefin fibers according to any of the preceding embodiments, wherein the duration of the plasma treatment according to step a) is from 1 sec to 10 min, preferably from 1 sec to 1 min.
8. The surface-modified polyolefin fibers according to any of the preceding embodiments, wherein the duration of step b) is from 1 sec to 30 min.
9. The surface-modified polyolefin fibers according to any of the preceding embodiments, wherein a flux of the electrically excitable gas is introduced into the plasma reactor.
10. The surface-modified polyolefin fibers according to any of the preceding embodiments, wherein the flux of electrically excitable gas introduced into the plasma reactor in the plasma treatment according to step a) is from 10 to 10000 sccm (standard cubic centimeters per minute), preferably from 10 to 5000 sccm.
11. The surface-modified polyolefin fibers according to any of the preceding embodiments, wherein the flux of electrically excitable gas introduced into the plasma reactor in step b) is from 10 to 10000 sccm, preferably from 10 to 5000 sccm.
12. The surface-modified polyolefin fibers according to any of the preceding embodiments, wherein the flux of gaseous siloxane or silazane compound introduced into the plasma reactor in step b) is from 1 to 2000 sccm, preferably from 1 to 500 sccm.
13. The surface-modified polyolefin fibers according to any of embodiments 9 to 12, wherein the flux of the electrically excitable gas introduced in step (a) is different from the flux of the electrically excitable gas introduced in step (b).
14. The surface-modified polyolefin fibers according to embodiment 13, wherein the flux of the electrically excitable gas introduced in step (a) is lower than the flux of the electrically excitable gas introduced in step (b).
15. The surface-modified polyolefin fibers according to any of the preceding embodiments, wherein the electrical power applied in the plasma treatment according to step a) is from 10 W to 30 kW, preferably from 10 W to 15 kW.
16. The surface-modified polyolefin fibers according to any of the preceding embodiments, wherein the electrical power applied in step b) is from 10 W to 30 kW, preferably from 10 W to 15 kW.
17. The surface-modified polyolefin fibers according to any of the preceding embodiments, wherein the electrically excitable gas is selected from argon, oxygen, nitrogen, air, ammonia, carbon dioxide, water or mixtures of two or more thereof.
18. The surface-modified polyolefin fibers according to any of the preceding embodiments, wherein the electrically excitable gas is oxygen.
19. The surface-modified polyolefin fibers according to any of the preceding embodiments, wherein the polar groups on the surface of the polyolefin fibers are selected from carbonyl, carboxyl, hydroxyl, amide, imide and/or nitrile groups.
20. The surface-modified polyolefin fibers according to embodiment 19, wherein the polar groups on the surface of the polyolefin fibers of step (a) are hydroxyl groups.
21. The surface-modified polyolefin fibers according to any of the preceding embodiments, wherein the gaseous siloxane or silazane compound is selected from linear or cyclic, mono- or polyalkylated siloxanes or silazanes or mixtures thereof.
22. The surface-modified polyolefin fibers according to embodiment 21, wherein the gaseous siloxane or silazane compound is selected from the group comprising hexamethyldisiloxane, octamethyltrisiloxane decamethyltetrasiloxane, dodecamethylpentasiloxan, hexamethylcyclotrisiloxane, octamethylcyclotetrasiloxane, decamethylcyclopentasiloxane, dodecamethylcyclohexasiloxane, tetramethylcyclotetrasiloxane, tetraethoxysilane, tetramethyldisiloxan, dimethyldimethoxysilane, hexamethyldisilazan, triethoxyphenylsiloxan and mixtures thereof.
23. The surface-modified polyolefin fibers according to embodiment 22, wherein the gaseous siloxane or silazane compound is selected from hexamethyldisiloxane, hexamethyldisilazane, decamethylcyclopentasiloxane or mixtures thereof.
24. The surface-modified polyolefin fibers according to any of the preceding embodiments, wherein the plasma treatment of the polyolefin fibers in presence of a gaseous siloxane or silazane compound is carried out at an energy level that is suitable for the deposition of an oxidized siloxane or silazane product on the surface of the polyolefin fibers.
25. The surface-modified polyolefin fibers according to any of the preceding embodiments, wherein the ions and radicals in the plasma treatment have an energy level of from 0.1 eV to 100 eV.
26. The surface-modified polyolefin fibers according to any of the preceding embodiments, wherein prior to or after, preferably prior to, the pretreatment according to step (a), the polyolefin fibers are mechanically shaped.
27. The surface-modified polyolefin fibers according to embodiment 26, wherein the mechanically shaping comprises embossing, crimping, twisting and/or stretching.
28. The surface-modified polyolefin fibers according to embodiment 27, wherein the mechanically shaping comprises stretching.
29. The surface-modified polyolefin fibers according to embodiment 28, wherein the stretching is performed to a draw ratio in the range of from 1 to 18.
30. The surface-modified polyolefin fibers according to embodiment 28 or 29, wherein the stretching is performed in two steps.
31. The surface-modified polyolefin fibers according to embodiment 30, wherein the stretching in the first step is performed to a draw ratio that is higher than the draw ratio in the second step.
32. The surface-modified polyolefin fibers according to embodiment 30 or 31, wherein the stretching in the first step is performed to a draw ratio of 5 to 12.
33. The surface-modified polyolefin fibers according to any of embodiments 30 to 32, wherein the stretching in the second step is performed to a draw ratio of 0.5 to 5.
34. The surface-modified polyolefin fibers according to any of the preceding embodiments, having a rectangular cross-section, a length of from 10 to 60 mm, a width (Dmax) of from 0.5 to 3 mm and a thickness (Dmin) of from 0.2 to 1 mm.
35. The surface-modified polyolefin fibers according to any of the preceding embodiments having a rectangular cross-section, a length of from 40 to 55 mm, a width of from 0.8 to 1.5 mm and a thickness of from 0.4 to 0.8 mm.
36. The surface-modified polyolefin fibers according to embodiment 34 or 35 which were mechanically shaped prior to step (a).
37. The surface-modified polyolefin fibers according to embodiment 36, which was mechanically shaped by embossing.
38. The surface-modified polyolefin fibers according to embodiment 37, wherein the height (he) of the embossing is in the range from 0.4 to 2.3 mm.
39. The surface-modified polyolefin fibers according to embodiment 37 or 38, wherein the embossing unit length (h) is in the range from 0.8 to 3 mm.
40. The surface-modified polyolefin fibers according to any of embodiments 37 to 39, wherein the depth (pe) of embossing is in the range from 0.03 to 0.12 mm.
41. The surface-modified polyolefin fibers according to any of embodiments 37 to 40, wherein the shift (se) of the embossing is in the range from 0 to the value of (h).
42. The surface-modified polyolefin fibers according to any of embodiments 37 to 41, wherein the angle (α) between the embossing and the longitudinal axis of the fiber is in the range from 0 to 60°.
43. The surface-modified polyolefin fibers according to any of embodiments 37 to 42, wherein the angle (β) between the embossing and the two opposite sides of the fiber is in the range from 0 to 2a.
44. The use of the surface-modified polyolefin fibers according to any of the preceding embodiments in inorganic binder compositions.
45. Inorganic binder composition containing the surface-modified polyolefin fibers according to any of embodiments 1 to 43.
46. Inorganic binder composition according to embodiment 45, containing the surface-modified polyolefin fibers in an amount of 0.1 to 10% of the total volume of the hydraulic binder composition.
47. Inorganic binder composition according to embodiment 45, containing the surface-modified polyolefin fibers in amount of 0.1 to 5% of the total volume of the hydraulic binder composition.
48. Inorganic binder composition according to embodiment 45, containing the surface-modified polyolefin fibers in amount of about 0.5% of the total volume of the hydraulic binder composition.
49. A method for reinforcing an inorganic binder composition comprising the steps
a) incorporating the surface-modified polyolefin fibers of embodiments 1 to 43 into the inorganic binder composition and b) curing the inorganic binder composition.
41. A method for producing the surface-modified polyolefin fibers of claims 1 to 43 comprising the steps of
  a) a pretreatment of the polyolefin fibers by contacting the polyolefin fibers with an electrically excitable gas in a plasma reactor to obtain polyolefin fibers with polar groups on the surface of the fibers and
  b) plasma treatment of the polyolefin fibers with an electrically excitable gas in presence of a gaseous siloxane or silazane compound in a plasma reactor.

Polyolefin Fibers of the Invention

The fibers are made from polyolefines such as polyethylene, polypropylene, copolymers thereof and blends of such fibers. It is clear for the skilled person that the fibers may include common additives such as fillers, glass fibers, compatibilizers, modifiers etc.

Polypropylene or polyethylene fibers or fibers from copolymers thereof, or blends of such fibers are preferred. Copolymers may for example be statistical, alternating or block copolymers. Polypropylene-based fibers are the most common type in the market and, usually, present a content of polypropylene higher than 80% in weight. It is well known in the prior art that polypropylene with low melt flow index (MFI, determined according to 1501133) is the preferable raw material in order to achieve high tensile strength fibers by a stretching process. Generally, values of MFI lower than 20 g/10 min are preferable and more preferable values are lower than 3 g/10 min.

The fibers may have any cross-section. Preferably the cross-section is rectangular, optionally with rounded corners, round (circular) or elliptical. Preferred are rectangular cross-sections or rectangular cross-sections with rounded corners. Rectangular cross-sections have a longer axis Dmax defining the width and a shorter axis Dmin which is perpendicular to the longer axis defining the thickness of the fibers, both axes passing through the central longitudinal axis of the fibers and Dmax being larger than Dmin. Dmax also refers to the main axis (the greater of the two diameters) of fibers having an oval or elliptical cross-section whereas Dmin also refers to the minor axis (the smaller of the two diameters) of fibers having an elliptical cross-section. Fibers having a circular cross-section have a diameter in the range of from 0.2 to 4 mm.

Pretreatment

The surface-modified polyolefin fibers of the invention are obtained by a process as given in embodiment 1. In one embodiment, step a) comprises solely the plasma treatment with an electrically excitable gas and no mechanical treatment. In a preferred embodiment, step a) comprises both, mechanical treatment and plasma treatment in presence of an electrically excitable gas. The order of these two options of pretreatment is variable. However, mechanical treatment before plasma treatment is preferred.

In general step a) is conducted prior to step b). Further, step (a) is carried out without addition of Prior to pretreatment, the polyolefin fibers are, if desired, washed in an organic solvent, for example an alcohol such as isopropyl alcohol. For this purpose the fibers are washed, for example, in an ultrasonic bath at room temperature for an appropriate time, for example 10 to 60 minutes, and then dried in an inert gas flux, for example a nitrogen flux, at room temperature or elevated temperature prior to step a).

Mechanical Shaping

Mechanical shaping of polyolefin fibers is optional and preferably carried outprior to step a). For mechanical shaping polyolefin filaments are used that are cut to the desired length after the mechanical shaping process. Mechanical shaping comprises preferably the techniques of embossing, crimping and/or stretching, with stretching being preferred. Said techniques may also be applied in combination. In particular, the fibers may first be stretched and then embossed and/or crimped. Methods for embossing, crimping or stretching are conventional and for example disclosed in U.S. Pat. No. 3,956,450, WO 2007/036058 A1 or DE 2927238 A1.

Embossing and/or crimping of the polyolefin fibers results in a structured surface of the fibers. The structuring of the surface of polyolefin fibers, optionally after stretching of the fibers, may be effected by crimping of the extruded fibers by mechanical force applied around the longitudinal axis, optionally at elevated temperatures. A suitable apparatus for crimping is made by Techno Plastic Sri.

The structuring of the surface, optionally after stretching of the fibers, is effected preferably by way of mechanical embossing of the fibers. Suitable devices for embossing polyolefin fibers are for example calenders with texturial rolls or gear crimping devices.

The fibers having rectangularcross-sections are preferably structured on the broader side, i.e. that side(s) the width of which is defined by Dmax. The surface of said fibers may be structured on both of said sides or on one of said sides. The fibers may be structured over their entire length or over a part thereof.

Figure 5A:
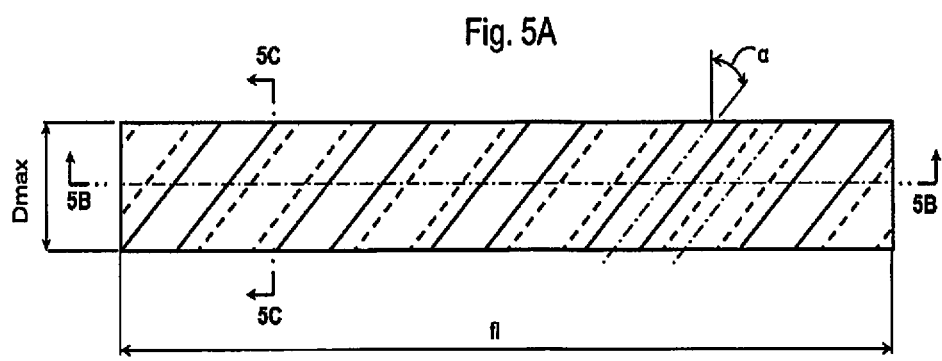
FIG. 5A is a top view of an embodiment of fiber with embossing pattern tilted from the longitudinal axis of the fiber and with the bottom side embossing pattern parallel to the top side embossing pattern.
Figures 5B, 5C:
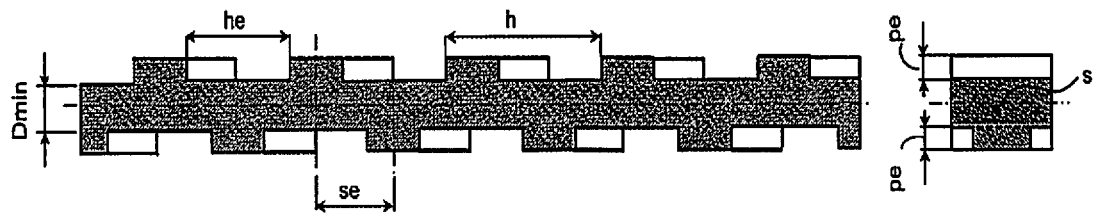
FIG. 5B is a sectional view of the fiber taken from FIG. 5A and illustrating the square wave profile present on the top and bottom surfaces of the fiber.
FIG. 5C is a sectional view of the fiber taken from FIG. 5A and illustrating the height (pe) of the relief and the nominal cross-section (s) of the fiber.
Figure 6A:
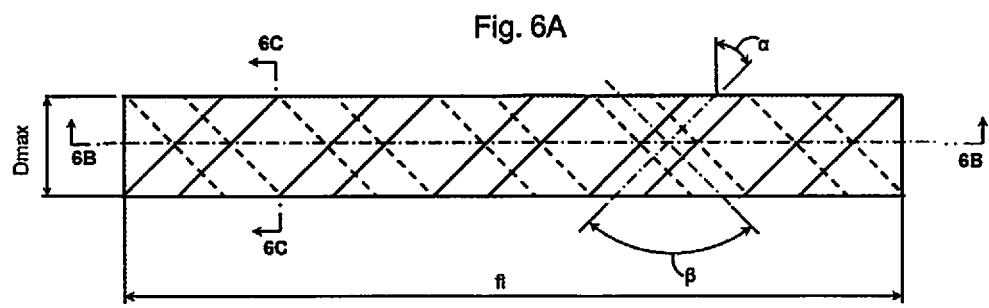
FIG. 6A is a top view of an embodiment of fiber with embossing pattern tilted from the longitudinal axis of the fiber and with the bottom side embossing pattern perpendicular to the top side embossing pattern.
Figures 6B, 6C:
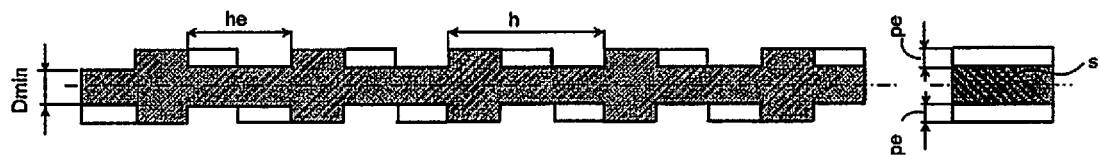
FIG. 6B is a sectional view of the fiber taken from FIG. 5A and illustrating the square wave profile present on the top and bottom surfaces of the fiber.
FIG. 6C is a sectional view of the fiber taken from FIG. 5A and illustrating the height (pe) of the relief and the nominal cross-section (s) of the fiber.

Mechanical shaping of fibers by embossing and the structures generated by this treatment may be characterized by the parameters (see FIG. 5A-5B-5C and FIG. 6A-6B-6C) fiber length (fl), height of embossing (he), embossing unit length (h), depth of embossing (pe), shift (se) of the embossing between the two opposite faces, angle ($\alpha$) between the embossing and the longitudinal axis of the fiber, angle ($\beta$) between the embossing on the two opposite faces of the fiber. The nominal cross-sectional area (s) of the fibers is defined as the area of the core fiber section perpendicular to the longitudinal axis as indicate in FIG. 5C and FIG. 6C (grey section). cross-section The embossing ratio (ER) is defined as the ratio of he to h. FIG. 5A shows a top view of an embodiment of a fiber having embossings tilted from the perpendicular to longitudinal axis by an angle $\alpha$. On the bottom face of the fiber the embossing is parallel to the embossing on the top face. FIG. 6A is a top view of an embodiment of a fiber having embossings on the bottom face tilted from the embossing on the top face by an angle $\beta$.

In the fibers of the invention, the values of fl are, in general, in the range of from 10 to 60 mm and preferably from 40 to 55 mm. Preferably, the values of Dmax for rectangular fibers, optionally with rounded corners, are in the range of from 0.5 to 3 mm and more preferably from 0.8 to 1.5 mm. In general, the values of Dmin for rectangular fibers, optionally with rounded corners, are in the range of from 0.2 to 1 mm and preferably from 0.4 to 0.8 mm. Preferably, the values of Dmax for elliptical or oval fibers are in the range of from 0.5 to 3 mm and more preferably from 0.8 to 1.5 mm. In general, the values of Dmin for for elliptical or oval fibers are in the range of from 0.2 to 1 mm and preferably from 0.4 to 0.8 mm. Preferably, the values of Dmax and Dmin respectively for round fibers are in the range of from 0.2 to 1 mm and more preferably from 0.4 to 0.8 mm. Preferably, the values of he are in the range of from 0.4 to 2.3 mm and more preferably from 0.8 to 1.5 mm. In general, the values of h are in the range of from 0.8 to 3 mm and preferably from 1.6 to 2 mm. Preferably, the values of pe are in the range of from 0.03 to 0.12 mm and more preferably from 0.04 to 0.1 mm. In general, the values of se are in the range of from 0 mm to equal to the value of h characterizing the embossing unit. Preferably, the values of $\alpha$ are in the range of from 0° to 60° and more preferable in the range from 40° to 50°. The values of $\beta$ are in the range of from 0° to 2·$\alpha$. In general, values of ER are in the range of from 0.4 to 0.85 and preferably from 0.5 to 0.8.

Figure 7A:
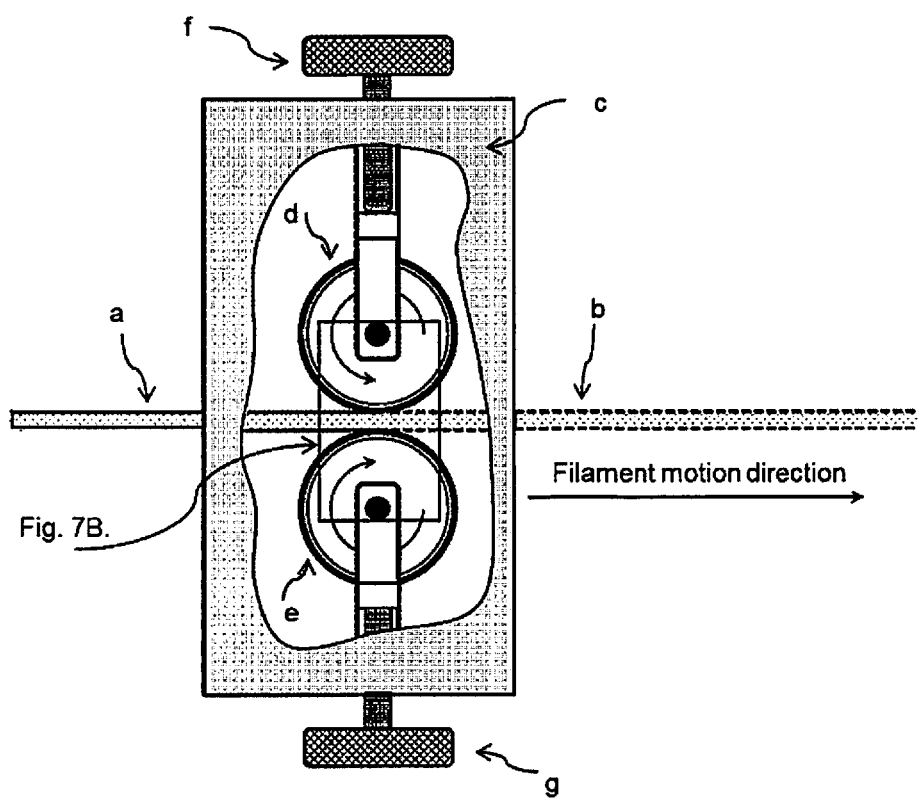
FIG. 7A is a cutaway drawing of an embodiment of embossing machine illustrating the process of mechanical reshaping of a plastic filament passing between two embossing rolls.

The mechanical shaping can be performed by calendering the filament using two patterned rolls. FIG. 7A is an exemplary schematic illustration of the calendering process and the equipment to perform it. This type of equipment is commonly used in the manufacture of plastic strapping bands for packaging (suitable equipment is commercially available, for example, from Techno Plastic Sri). A continuous not embossed filament (a) passes through the embossing machine (c) where two rolls (d, e) produce the shaped filament (b). The distance between the rolls is set with accuracy by means of the micrometer screws (f, g). In order to emboss the filament at a temperature higher than room temperature, a heating device, such as an electric oven or infrared lamp, is installed before the embossing machine so that the filament passes through the heating device prior to entering into the embossing machine. FIG. 7B shows some details of the rolls (c, d) rotating at the same angular speed ($\omega$) and producing an embossing on the filament (a, b). On the surface of the rolls there is a pattern made of peaks (e) and valleys (f). The rolls and the pattern on the surface are defined by parameters such as the outside diameter (R1), the height of the relief (h), the angular distance between two peaks ($\alpha$), the length of the peaks (g), the distance between the rotating axes of the rolls (D) and the phase shift ($\phi$). FIG. 7C is a top view of a roll (a) with a patterned surface made of a sequence of peaks (b) and valleys (c) tilted from the rotational axis by an angle of $\beta$.

Plasma Treatment

Contacting the polyolefin fibers with an electrically excitable gas (step a)) and plasma treatment of the polyolefin fibers in presence of a gaseous siloxane or silazane compound are carried out in a conventional device suitable for plasma reactions, for instance in a plasma reactor.

In general, energy may be introduced into a plasma reactor as electrical energy, especially by DC voltage or AC voltage of different frequencies, radiation energy, particularly introduced by microwaves or radiowaves, electromagnetic energy or thermal energy. The energy sufficient for the generation of a plasma depends on the characteristics of the plasma reactor and the excitable gases used and can be easily determined by the skilled person. The introduction of energy into the plasma reactor by microwaves, radiowaves or AC or DC voltage is preferred.

For the plasma treatment, a plasma generated at atmospheric pressure, or a vacuum plasma generated under reduced pressure may be used. The use of a vacuum plasma is preferred. Appropriate pressures for vacuum plasma treatment of polyolefin fibers are higher than 0.05 Pa, for example from 0.1 to 100 Pa, for example about 1 Pa.

Appropriate conditions for the plasma treatment of polyolefin fibers according to step a) with an electrically excitable gas are as follows: Preferably the electrically excitable gas is selected from argon, oxygen, nitrogen, air, ammonia, carbon dioxide, water or mixtures thereof. Particularly preferred is the use of oxygen or air. The electrically excitable gas is introduced into the plasma reactor with a gas flux of for example 10 to 10000 sccm, preferably 20 to 1000 sccm, in particular 50 to 200 sccm. The power applied may vary from 10 W to 30 kW, preferably 50 W to 500 W. As a power source a radiofrequency generator, offering a frequency of for example 13.56 MHz is preferred. As a time range for step a) 1 sec to 1 min is preferred, in particular 1 sec to 10 sec, for example about 5 sec is particularly preferred.

Depending on the excitable gas used, different polar groups can be introduced on the surface of the polyolefin fibers, preferably carbonyl, carboxyl, hydroxyl, amide, imide and/or nitrile groups. In particular the generation of hydroxyl groups via the use of oxygen, water or air as electrically excitable gas is preferred.

Appropriate conditions for the plasma treatment according to step b) are as follows: A gaseous siloxane or silazane compound is introduced into the plasma reactor and brought in contact with the polyolefin fibers obtained after step a) under plasma conditions. For this purpose, the electrically excitable gas and the gaseous siloxane or silazane compound may be mixed before the introduction into the reactor or they are independently introduced into the reactor. Preferably both gas streams are introduced independently and simultaneously or subsequently. The electrically excitable gas is introduced into the plasma reactor with a gas flux of for example 10 to 10000 sccm, preferably 20 to 1000 sccm, in particular 50 to 200 sccm. The gaseous siloxane or silazane compound is introduced into the plasma reactor with a gas flux of for example 1 to 500 sccm, preferably 1 to 100 scorn, in particular 1 to 10 sccm. The ratio of both gases introduced into the reactor may vary from 1/1 to 1/20 (siloxane or silazane compound/electrically excitable gas), preferably from 1/5 to 1/15, in particular the ratio is about 1/10. As a time range for step b) 1 sec to 30 min is preferred, in particular 1 sec to 1 min, for example about 30 sec is particularly preferred. The power applied may vary from 10 W to 30 kW, preferably 50 W to 500 W, depending on the power source.

In general, the gas flux during step b) is higher than the gas flux during the plasma treatment according to step a), for example by a factor of 1.1 to 5. Additionally, the power applied during the plasma treatments is again higher for the treatment according to step b) compared to the plasma treatment according to step a), for example by a factor of 1.1 to 5.

The gaseous siloxane or silazane compound may be selected from linear or cyclic, mono- or polyalkylated siloxanes or silazanes or mixtures thereof. Preferably the gaseous siloxane or silazane compound is selected from the group consisting of hexamethyldisiloxane, octamethyltrisiloxane decamethyltetrasiloxane, dodecamethylpentasiloxan, hexamethylcyclotrisiloxane, octamethylcyclotetrasiloxane, decamethylcyclopentasiloxane, dodecamethylcyclohexasiloxane, tetramethylcyclotetrasiloxane, tetraethoxysilane, tetramethyldisiloxan, dimethyldimethoxysilane, hexamethyldisilazan, triethoxyphenylsiloxan or mixtures thereof, more preferably from hexamethyldisiloxane, hexamethyldisilazane, trimethoxymethylsilane, decamethylcyclopentasiloxane or mixtures thereof. In particular hexamethyldisiloxane is used in step (b).

The treatment of polyolefin fibers according to step b) results preferably in the deposition of silica on the polyolefin surface. In particular, suitable siloxane or silazane compounds are converted under plasma conditions including especially an oxygen containing excitable gas, for example oxygen, water or air, in a manner that especially alkyl or methylene groups are oxidized (for example, to $CO_2$ and water) and oxidation product of the siloxane or silazaneremains on the surface of the polyolefin fibers by a reaction with the polar groups introduced by the plasma treatment according to step a). It is assumed that this results in a silica coating of the polyolefin fibers by covalent bonding between the fiber surface and the silica coating (without wishing to be bound to this assumption).

Inorganic Binder Compositions

The invention further concerns the use of surface-modified polyolefin fibers as reinforcing agents in inorganic, in particular hydraulic binder compositions offering materials of very high strength but reduced weight. The present invention overcomes the bonding limitations observed with polymeric fibrous materials such as polypropylene. As a result of the improved bonding characteristics, the binder compositions containing surface-modified polyolefin fibers of the invention generally offer residual tensile strengths 30 to 40% higher than compositions produced using comparable untreated polyolefin fibers.

Said binder compositions may contain cement, gypsum, anhydrite, slag, preferably ground granulated blast furnace slag, fly ash, silica dust, metakaolin, natural pozzolans, calcined oil shale, calcium sulphoaluminate cement and/or calcium aluminate cement. Preferred is a binder composition containing cement, anhydrite, slag, preferably ground granulated blast furnace slag, fly ash, silica dust, natural pozzolans, calcium sulphoaluminate cement and/or calcium aluminate cement.

Further preferred as a hydraulic binder composition is a cementitious composition containing cement.

Cement is an inorganic hydraulic binder and is defined by various national standards and classification systems, for example as under the European Standard EN 197 or the ASTM C150 that is used primarily in the United States of America. Any kind of cement may be used.

Gypsum as a non-hydraulic binder comprises in this context all possible calcium sulfate carriers with different amounts of crystal water molecules, like for example also calcium sulfate hemihydrate, dihydrate, monohydrate or anhydrite including any hydrous or anhydrous phases and polymorphs thereof.

The binder compositions, preferably cement based suspensions, can also contain any formulation component typically used in the field of construction materials, defoamers, air entrainers, set retarders, shrinkage reducers, redispersible powders, hardening accelerators, anti-freezing agents, plasticizers, superplasticizers, corrosion inhibitors and/or anti-efflorescence agents or mixtures thereof.

The surface-modified polyolefin fibers are contained in a binder composition preferably in an amount of 0.1 to 10% of the total volume of the binder composition, more preferably 0.1 to 5%, in particular about 0.5%. The length of the fibers suitable for use in hydraulic binder compositions is in general less than 100 mm, with the preferred length being in the range 10 to 60 mm, in particular about 40 mm.

An advantage of the invention is a structure reinforced inorganic binder composition containing the surface-modified polyolefin fibers as described above, the fibers being capable of endowing enhanced mechanical stability combined with improved and enhanced flexibility and ductility. The fibers of the invention may not only be utilized to improve or enhance flexibility and ductility of dense structures obtained after setting of hydraulic binder compositions, but also may confer improved mechanical properties to porous structures or grains such as in foamed gypsum boards. The polyolefin fiber containing compositions, materials or structures of the invention are also understood to be "fiber-reinforced" compositions, materials or structures.

Another aspect of the invention is a method for reinforcing an inorganic binder composition comprising the steps incorporating the surface-modified polyolefin fibers into a hydraulic binder composition and curing the hydraulic binder composition Incorporating the surface-modified polyolefin fibers into an inorganic binder composition means mixing the fibers with all the other ingredients of said binder composition in an appropriate container. The ingredients may be mixed in any order.

The following examples are to illustrate the invention without limiting it:

Surface Modification of Polyolefin Fibers

The preparation of the polyolefin fibers used in the following examples was carried out by melt extrusion, orientation, mechanical shaping and cutting. The polypropylene homopolymer named Isplen PP 020 G3E (made by Repsol) was melted in a single screw extruder set at a temperature of 240° C., and then extruded through a rectangular die. The extrudate was cooled and solidified by immersion in a water bath maintained at a constant temperature of 15° C., and was then stretched by means of rolls rotated at different speed to the desired draw ratio in order to increase the final tensile strength. The stretching process was carried out by two different stretching stages. In the first stretching stage the filament, passing through an electrical oven set at a temperature of 150° C., was stretched at a draw ratio of 9. In the second stretching stage the filament, passing through an electrical oven set at a temperature of 230° C., was stretched at a draw ratio of 1.7, so the total draw ratio of the two stretching process was 15.3. After the stretching stages the filament was led into an embossing machine with two rotating rolls where the surface of the filament was shaped at room temperature. The two rolls were defined by the following parameters: the outside diameter (FIG. 7B-R1) was 66.6 mm, the height of the relief (FIG. 7B-h) was 0.2 mm, the angular distance between two peaks (FIG. 7B-α) was 3°, the length of the peaks (FIG. 7B-g) was 0.90 mm, the distance between the rotating axes of the rolls (FIG. 7B-D) was 133.7 mm, the phase shift (FIG. 7B-φ) was 0.5° and the axis pattern was tilted from the rotational axis by an angle of 45° (FIG. 7C-β). These rolls produced an embossing pattern like that one illustrated in FIG. 6A, FIG. 6B and FIG. 6C. After the embossing process the filament was led to cutting machine where the filament was cut to fibers having a length of 52 mm. The resulting fibers had a tensile strength of about 500 MPa determined according to EN 14889-2 standard. The values of the parameters that define the geometric shape of the fibers were determined by optical microscopy according to EN 14889-2 standard. The fiber width (FIG. 6A-Dmax) was 1.22 mm, the fiber thickness (FIG. 6B-Dmin) was 0.55 mm, the height of embossing (FIG. 6B-he) was 0.90 mm, the embossing unit length (FIG. 6B-h) was 1.74 mm, the depth of embossing (FIG. 6C-pe) was 0.04 mm, the shift (FIG. 6B-se) was 0.30 mm, the angle (FIG. 6A-α) was 45° and the angle (FIG. 6A-β) was 90°. The value of the embossing rate (ER) was 0.52.

Example 1

Polypropylene fibers obtained as described above were washed in isopropyl alcohol in an ultrasonic bath at room temperature for 15 minutes. Afterwards the fibers were dried in a nitrogen flux at room temperature for 60 minutes. A plasma reactor (Barrel coaters produced by Thin Films srl) was charged with the washed and dried polypropylene fibers (50 g) and the plasma reactor was evacuated to a pressure of $5 \times 10^{-3}$ mbar. In the first step the polypropylene fibers were treated with an oxygen flux under the following conditions:
Oxygen flux: 20 sccm
RF power: 50 W
Treatment time: 30 min
Rotation speed: 20 rpm
Frequency: 13.56 MHz
For the second step of treatment RF power was raised to 100 W, oxygen flux was adjusted to 35 sccm and an additional flux of hexamethyldisiloxane (3.5 scam) was introduced into the polypropylene fibers containing plasma reactor. The further process parameters for the second step of treatment were:
Treatment time: 30 min
Rotation speed: 20 rpm
Frequency: 13.56 MHz Example 2 (Comparative Example)

Polypropylene fibers obtained as described above were washed and dried as described in example 1. A plasma reactor as used in example 1 was charged with the washed and dried polypropylene fibers (50 g) and then evacuated to a pressure of $5 \times 10^3$ mbar. The polypropylene fibers were treated with an oxygen flux under the following conditions:
Oxygen flux: 20 sccm
RF power: 50 W
Treatment time: 30 min
Rotation speed: 20 rpm
Frequency: 13.56 MHz Example 3 (Comparative Example)

Polypropylene fibers obtained as described above were washed and dried as described in example 1. A plasma reactor as used in example 1 was charged with the washed and dried polypropylene fibers (50 g) and evacuated to a pressure of $5 \times 10^4$ mbar. The polypropylene fibers were treated under the following conditions:
Oxygen flux: 35 sccm
Hexamethyldisiloxane flux: 3.5 sccm
RF power: 50 W
Treatment time: 30 min
Rotation speed: 20 rpm
Frequency: 13.56 MHz
Single Fiber Pull-Out Tests
The three plasma-treated polypropylene fibers of Examples 1-3 and an untreated polypropylene fiber were tested in a single fiber pull-out test. For this purpose, a mortar composition with the following ingredients and the respective equivalents was prepared by mixing:

| | |
|---|---|
| CEM I 52.5 R Cementerie Monselice | 1.0 equivalents |
| CEN-Normsand DIN 196 | 3.0 equivalents |
| Cremaschi limestone filler | 0.2 equivalents |
| Master Glenium ® SKY 623 | 1.2% (by weight of cement) |
| MasterMATRIX ® 150 | 0.9% (by weight of cement) |
| Water | 0.5 equivalents |

Said mortar composition was filled in a plastic cube (7 cm$^3$) and a single fiber of each of Examples 1 to 3 or the untreated polypropylene fiber sample was embedded to a length of 15 mm. By this procedure ten specimens for each fiber sample (Example 1, 2, 3, untreated) were cast and cured for 28 days in a conditioning room (Temperature=21±1° C., relative humidity>95%). Each of the specimens was fixed on the electromechanic Instron 3344 testing machine and the pull-out test was conducted at a constant displacement rate. Data for the crosshead displacement and the applied load were collected and summarized in FIG. 1.
The fibers of Examples 2 and 3 showed the same behavior as untreated fiber, no improvement was detected. In contrast, the maximum load for the fiber of Example 1 was about 40% higher than that of the untreated one and those of Examples 2 and 3.
Residual Tensile Strength Evaluation
The residual tensile strength of different concrete compositions containing one of the surface-modified polypropylene fibers of examples 1 to 3 or untreated polypropylene fibers was compared. Basis for the concrete compositions employed in this measurements were the mortar mixes according to table 1:

TABLE 1

Mortar mixes 1 and 2.

|  | Mix 1* | Mix 2* |
|---|---|---|
| CEM II/A-LL 42.5 R Cementerie Monselice | 1.0 | — |
| CEM II/A-LL 42.5 R Colacem Gubbio | — | 1.0 |
| Mosole Crushed Sand 0/4 | 3.5 | 3.5 |
| Mosole Crushed 8/12 | 1.8 | 1.8 |
| Mosole Crushed 12/19 | 1.0 | 1.0 |
| MasterGleniume ® SKY 623 | 0.4% (by weight of cement) | 0.5% (by weight of cement) |
| Water | 0.66 | 0.65 |

*equivalents

The surface-modified polypropylene fibers of examples 1 to 3 or untreated polypropylene fibers were introduced into the mixes of table 1 in an amount of respectively 0.5% based on the total volume of the resulting composition.

The concrete compositions were prepared by mixing the raw materials in a planetary mixer of 50 liters maximum load. The dry materials (fibers included) were mixed for 30 sec, introducing 50% of the total amount of water. Then cement was added together with the rest of water and the superplasticizer MasterGlenium® SKY 623 and the resulting composition was mixed for 1 min.

Of each concrete composition nine prisms with the dimensions 15×15×60 cm were prepared. The specimens were demoulded after 24 h and cured for 28 days in a conditioning room (T=21±1° C., relative humidity>95%). The specimens were prepared and tested according to the three point bending test (EN 14651). The prisms were partially cut by means of a saw producing 12.5 mm notches at the mid-span of the specimens, which guaranteed the localization of the crack formation. The crack mouth opening displacement was controlled installing a displacement transducer and the applied load was monitored.

Significant parameters for the characterization of the different mortar compositions are the Limit of Proportionality (LOP) based on the first crack appearing and four different residual tensile strength indexes called $f_{Rn}$. These values are related to the stress measured at different crack mouth opening displacements (CMOD):

$f_{R1}$=load at 0.5 mm CMOD $f_{R2}$=load at 1.5 mm CMOD $f_{R3}$=load at 2.5 mm CMOD $f_{R3}$=load at 3.5 mm CMOD In tables 2 and 3 the results for the two mortar mixes containing the differently treated or untreated polyolefin fibers are summarized:

TABLE 2

Residual tensile strength improvement in concrete mix 1.

|  | Mix 1 containing untreated fibers | Mix 1 containing fibers of Example 2 | Mix 1 containing fibers of Example 3 | Mix 1 containing fibers of Example 1 |
|---|---|---|---|---|
| LOP | 4.52 | 4.15 | 4.32 | 4.35 |
| $f_{R1\ (0.5\ mm\ CMOD)}$ | 0.95 | 0.96 | 0.98 | 1.26 |
| $f_{R2\ (1.5\ mm\ CMOD)}$ | 0.95 | 0.94 | 0.98 | 1.32 |
| $f_{R3\ (2.5\ mm\ CMOD)}$ | 1.02 | 1.01 | 1.10 | 1.47 |
| $f_{R4\ (3.5\ mm\ CMOD)}$ | 1.00 | 1.01 | 1.11 | 1.52 |

TABLE 3

Residual tensile strength improvement in concrete mix 2.

|  | Mix 2 containing untreated fibers | Mix 2 containing fibers of Example 2 | Mix 2 containing fibers of Example 3 | Mix 2 containing fibers of Example 1 |
|---|---|---|---|---|
| LOP | 4.71 | 4.65 | 4.32 | 4.69 |
| $f_{R1\ (0.5\ mm\ CMOD)}$ | 1.43 | 1.44 | 1.45 | 1.68 |
| $f_{R2\ (1.5\ mm\ CMOD)}$ | 1.29 | 1.32 | 1.34 | 1.71 |
| $f_{R3\ (2.5\ mm\ CMOD)}$ | 1.26 | 1.33 | 1.41 | 1.75 |
| $f_{R4\ (3.5\ mm\ CMOD)}$ | 1.21 | 1.32 | 1.40 | 1.69 |

Both mixes 1 and 2 offer higher tensile strength values, when containing the fibers of Example 1. The fibers of Examples 2 or 3 or untreated polyolefin fibers do not show any improvement of residual tensile strength.

Figure 2:
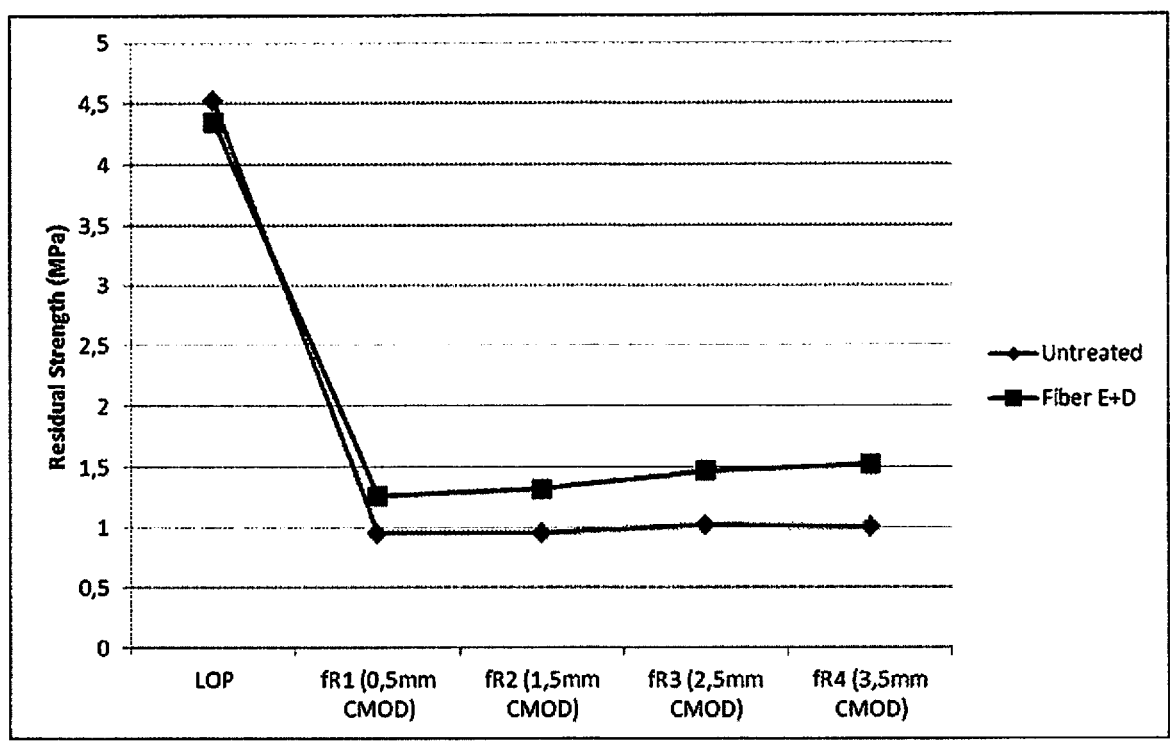
FIG. 2 shows a comparison of tensile strength developments of hydraulic binder compositions containing untreated polypropylene fibers or surface-modified polypropylene fibers and a concrete mix 1. (E+D=etching process+deposition process)
Figure 3:
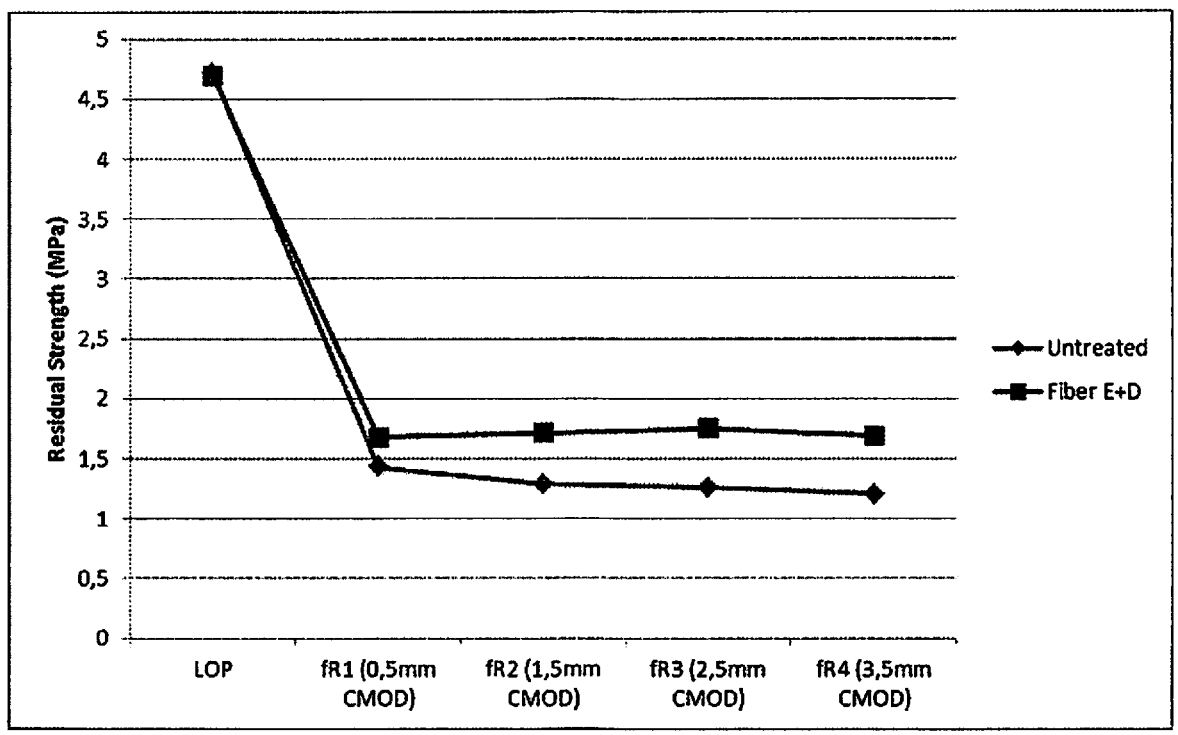
FIG. 3 shows a comparison of tensile strength developments of hydraulic binder compositions containing untreated polypropylene fibers or surface-modified polypropylene fibers and a concrete mix 2. (E+D=etching process+deposition process)

For a further clarification see FIG. 2 and FIG. 3 showing the residual tensile strength development under continuous crack opening of mix 1 containing untreated fiber and mix 1 containing the fibers of Example 1 (FIG. 2) and the residual tensile strength development under continuous crack opening of mix 2 containing untreated fiber and mix 2 containing the fibers of Example 1 (FIG. 3).

In order to show that the addition of fibers to the mortar mixes 1 and 2 does not affect the fresh concrete properties, a slump test (according to EN 12350-2) and measurements of the air content (according to EN 12350-7) were carried out. For a comparison see the following tables 4 and 5:

TABLE 4

Results of the slump test and the determination of the air content for mix 1.

| Mix 1 (0.5% fiber volume) | Fibers of Example 2 | Fibers of Example 3 | Fibers of Example 1 | Untreated fibers |
|---|---|---|---|---|
| Slump (mm) | 185 | 195 | 180 | 185 |
| Air Content (%) | 2.1 | 2.2 | 2.3 | 2.2 |

TABLE 5

Results of the slump test and the determination of the air content for mix 2.

| Mix 2 (0.5% fiber volume) | Fibers of Example 2 | Fibers of Example 3 | Fibers of Example 1 | Untreated fibers |
|---|---|---|---|---|
| Slump (mm) | 180 | 195 | 190 | 195 |
| Air Content (%) | 2.1 | 2.3 | 2.1 | 2.0 |

Flexural Toughness Measurements

For the measurement of the flexural toughness of concrete compositions according to ASTM C 1550 a concrete Mix 3 with the ingredients of table 6 was used:

TABLE 6

Ingredients of Mix 3.

|  | Mix 3* |
|---|---|
| Type I/II Cement | 1.0 |
| Silica Fume | 0.1 |
| 9.5 mm (topsize) Limestone | 1.1 |
| River bed sand | 2.7 |

TABLE 6-continued

Ingredients of Mix 3.

| | Mix 3* |
|---|---|
| Glenium ® 7500 | 1.1% (b.w.c.) |
| Water | 0.41 |

*equivalents

A concrete composition was prepared mixing the raw materials of Mix 3 in a mixer of 150 liters maximum load. The dry materials and fibers (untreated polyolefin fibers or fibers of Example 1) in an amount of 0.55% based on the total volume of the concrete composition were mixed for 60 sec, thereby introducing 50% of the total amount of water. Then cement was added together with the rest of water and the superplasticizer MasterGlenium® 7500 and the resulting composition was mixed for 1 min.

Again slump tests (according to ASTM C 134) and the measurement of the air content (according to ASTM C 231) of the concrete compositions, a) Mix 3 containing untreated fibers or b) Mix 3 containing Fibers of Example 1, did show that the properties of the fresh concrete compositions are not impaired.

Of both concrete compositions four round panels of 800 mm diameter and 70 mm were cast. The specimens were demoulded after 24 h and cured for 28 days in a conditioning room (T=21±1° C., relative humidity>95%). The specimens were prepared and tested according to the round panel test according to ASTM C 1550. This test method includes the determination of flexural toughness of fiber-reinforced concrete compositions, expressed as energy absorption in the post-crack range. Therefore, a round panel supported on three symmetrically arranged pivots and subjected to a central point load was used. The performance of specimens tested by this method was quantified in terms of the energy absorbed between the onset of loading and selected values of central deflection.

Figure 4:
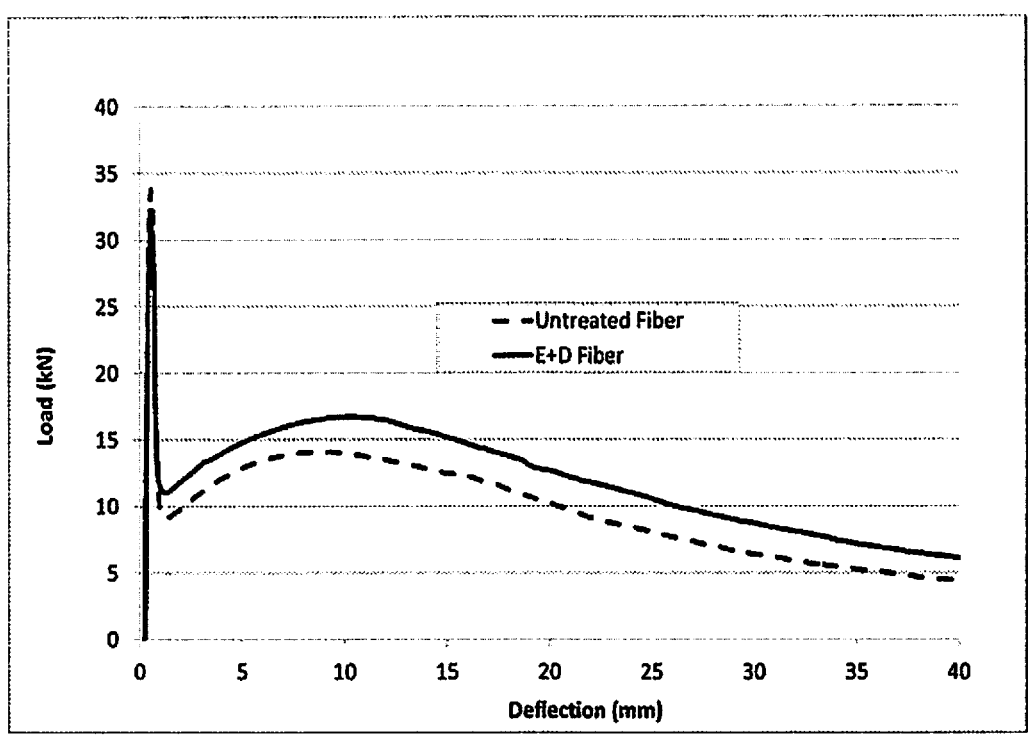
FIG. 4 shows the average flexural toughness development under continuous deflection of hydraulic binder compositions containing untreated polypropylene fibers or surface-modified polypropylene fibers. (E+D=etching process+deposition process)

FIG. 4 shows the average flexural toughness development under continuous deflection of the concrete compositions a) and b):

The area below the curve is greater for composition b) compared to the area below the curve resulting for composition a). In particular the improvement of energy absorption for the concrete composition b) is about 13% compared to concrete composition a).

The invention claimed is:

1. An inorganic binder composition containing surface-modified polyolefin fibers obtained by a process comprising the steps of
    a) a pretreatment of the polyolefin fibers by plasma treatment with an electrically excitable gas selected from air, oxygen, water, and mixtures thereof in a plasma reactor to obtain polyolefin fibers with polar groups on the surface and
    b) plasma treatment of the polyolefin fibers with an electrically excitable gas in the presence of a gaseous siloxane compound in a plasma reactor.

2. The composition according to claim 1, wherein the polyolefin fibers are selected from polyethylene fibers, polypropylene fibers, or fibers from copolymers thereof, or blends thereof.

3. The composition according to claim 1, wherein the ratio of gaseous siloxane compound to electrically excitable gas is from 1/1 to 1/20 (siloxane compound/electrically excitable gas).

4. The composition according to claim 1, wherein the polar groups on the surface of the polyolefin fibers are selected from carbonyl, carboxyl, hydroxyl, amide, imide and/or nitrile groups.

5. The composition according to claim 1, wherein the gaseous siloxane compound is selected from linear or cyclic, mono- or polyalkylated siloxanes or silazanes or mixtures thereof.

6. The composition according to claim 5, wherein the gaseous siloxane compound is selected from hexamethyldisiloxane, decamethylcyclopentasiloxane or mixtures thereof.

7. The composition according to claim 1, wherein the plasma treatment of the polyolefin fibers in presence of a gaseous siloxane compound is carried out at an energy level that is suitable for the deposition of silica on the surface of the polyolefin.

8. The composition according to claim 7, wherein the ions and radicals in the plasma treatment have an energy level of from 0.1 eV to 100 eV.

9. The composition according to claim 1, wherein prior to the pretreatment according to step (a) the polyolefin fibers are mechanically shaped.

10. The composition according to claim 9, wherein mechanically shaping comprises embossing, crimping, twisting and/or stretching.

11. The composition according to claim 1, wherein the polyolefin fibers have a length of 10 to 60 mm, a width of from 0.5 to 3 mm and a thickness of from 0.2 to 1 mm.

12. An inorganic binder composition containing surface-modified polyolefin fibers obtained by a process comprising the steps of
    a) a pretreatment of the polyolefin fibers by plasma treatment with an electrically excitable gas in a plasma reactor to obtain polyolefin fibers with polar groups on the surface; and
    b) plasma treatment of the polyolefin fibers with an electrically excitable gas in the presence of a gaseous silazane compound in a plasma reactor.

13. The composition according to claim 12, wherein the polyolefin fibers are selected from polyethylene fibers, polypropylene fibers, or fibers from copolymers thereof, or blends thereof.

14. The composition according to claim 12, wherein the ratio of gaseous silazane compound to electrically excitable gas is from 1/1 to 1/20 (silazane compound/electrically excitable gas).

15. The composition according to claim 12, wherein the electrically excitable gas is selected from argon, oxygen, nitrogen, air, ammonia, carbon dioxide, water or mixtures of two or more thereof.

16. The composition according to claim 12, wherein the polar groups on the surface of the polyolefin fibers are selected from carbonyl, carboxyl, hydroxyl, amide, imide and/or nitrile groups.

17. The composition according to claim 12, wherein the gaseous silazane compound is selected from linear or cyclic, mono- or polyalkylated silazanes or mixtures thereof.

18. The composition according to claim 17, wherein the gaseous silazane compound comprises hexamethyldisilazane.

19. The composition according to claim 12, wherein the plasma treatment of the polyolefin fibers in presence of a gaseous silazane compound is carried out at an energy level that is suitable for the deposition of silica on the surface of the polyolefin.

20. The composition according to claim 19, wherein the ions and radicals in the plasma treatment have an energy level of from 0.1 eV to 100 eV.

21. The composition according to claim 12, wherein prior to the pretreatment according to step (a) the polyolefin fibers are mechanically shaped.

22. The composition according to claim 21, wherein mechanically shaping comprises embossing, crimping, twisting and/or stretching.

23. The composition according to claim 12, wherein the polyolefin fibers have a length of 10 to 60 mm, a width of from 0.5 to 3 mm and a thickness of from 0.2 to 1 mm.

* * * * *